US011106919B1

(12) United States Patent
Balogh et al.

(10) Patent No.: US 11,106,919 B1
(45) Date of Patent: Aug. 31, 2021

(54) PROCESSING OF VIDEO STREAMS

(71) Applicant: ULTINOUS Zrt., Budapest (HU)

(72) Inventors: György Balogh, Szada (HU); László Balázs, Érd (HU)

(73) Assignee: ULTINOUS Zrt., Budapest (HU)

( * ) Notice: Subject to any disclaimer, the term of this patent is extended or adjusted under 35 U.S.C. 154(b) by 0 days.

(21) Appl. No.: 16/890,382

(22) Filed: Jun. 2, 2020

(51) Int. Cl.
*G06N 3/08* (2006.01)
*G06K 9/00* (2006.01)
*G06F 9/48* (2006.01)

(52) U.S. Cl.
CPC ....... *G06K 9/00771* (2013.01); *G06F 9/4843* (2013.01); *G06K 9/00718* (2013.01); *G06K 9/00744* (2013.01); *G06N 3/08* (2013.01); *G06K 2009/00738* (2013.01)

(58) Field of Classification Search
None
See application file for complete search history.

(56) References Cited

U.S. PATENT DOCUMENTS

| | | |
|---|---|---|
| 2002/0181765 A1 | 12/2002 | Mori et al. |
| 2006/0288228 A1* | 12/2006 | Botz ............... H04L 63/08 713/182 |
| 2014/0040222 A1 | 2/2014 | Schmitz et al. |
| 2016/0323367 A1 | 11/2016 | Murtha et al. |
| 2016/0357493 A1* | 12/2016 | Zerwas ............ G06F 3/1438 |
| 2018/0018508 A1 | 1/2018 | Tusch |
| 2018/0152361 A1* | 5/2018 | Chu ............... H04L 67/02 |
| 2018/0248772 A1 | 8/2018 | Orsini et al. |
| 2019/0114804 A1* | 4/2019 | Sundaresan ........ G06K 9/66 |
| 2020/0117905 A1 | 4/2020 | Yakupov et al. |
| 2020/0327047 A1* | 10/2020 | Mayhew ........... G06F 11/3692 |

FOREIGN PATENT DOCUMENTS

CN 109922315 A 6/2019

OTHER PUBLICATIONS

Github.com, "INF-1357 Import from Dlservice c146ba3de • Ultinous/Uvap@32f2257", Jun. 3, 2020, 34 pages.
Yang, et al, "From Facial Parts Response to Face Detection: A Deep Learning Approach", IEEE International Conference on Computer Vision, Sep. 2015, 9 pages.
Uddin, et al, "SIAT: A Distributed Video Analytics Framework for Intelligent Video Surveillance", Symmentry, MDPI, Jul. 12, 2019, 20 pages.

* cited by examiner

*Primary Examiner* — Eileen M Adams
(74) *Attorney, Agent, or Firm* — Flaster Greenberg, P.C.

(57) ABSTRACT

A computer-implemented method of processing a video stream comprises:
  feeding the at least one video stream to at least two video processing detectors, each comprising a respective deep convolutional neural network trained to detect one or more of the object or a property of the object;
  for each of said at least two video processing detectors, receiving a respective stream of object lightweight data records from the respective video processing detector, the stream of object lightweight data records generated based on the respective detection, and representing a property of the object; and
  feeding at least one stream of object lightweight data records to at least one context detector configured to perform a secondary detection based on object lightweight data of the stream of object lightweight data records,
wherein the detections of the at least two video processing detectors are scheduled by a task-graph scheduler.

25 Claims, 6 Drawing Sheets

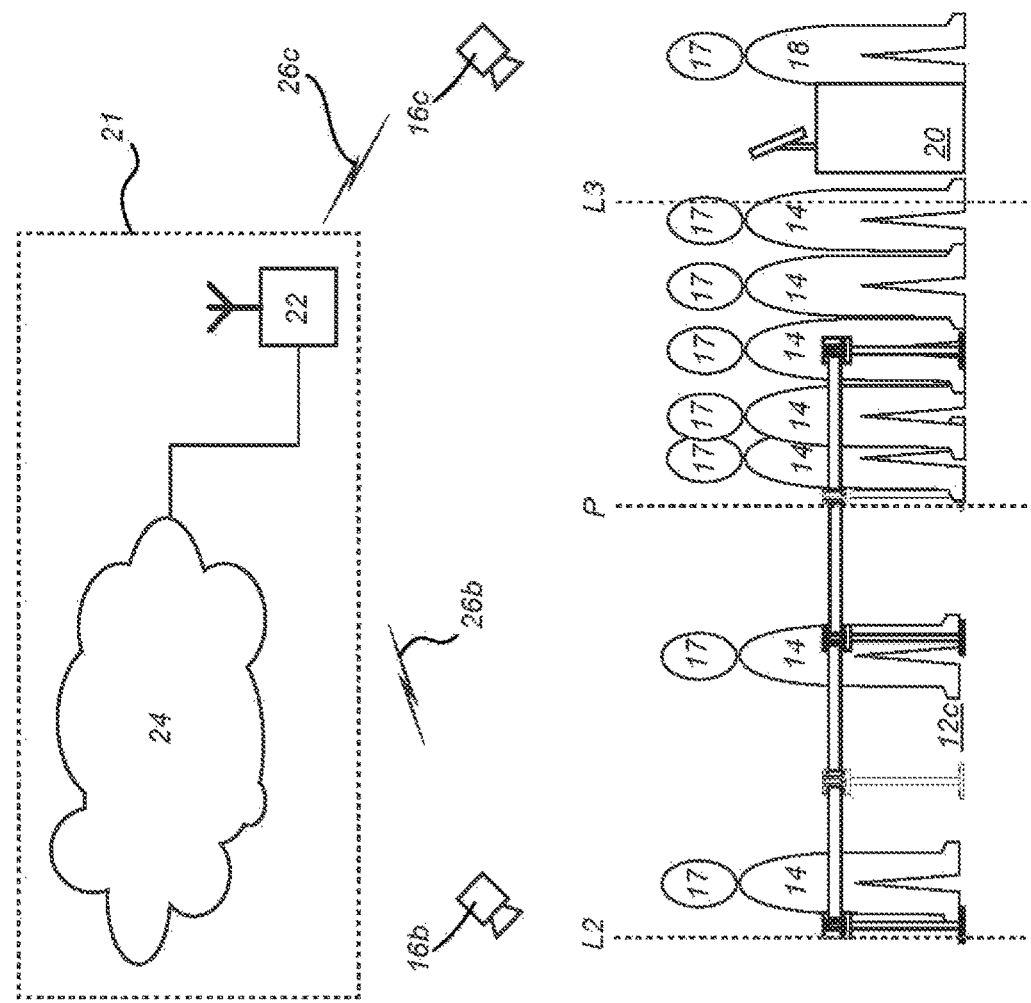
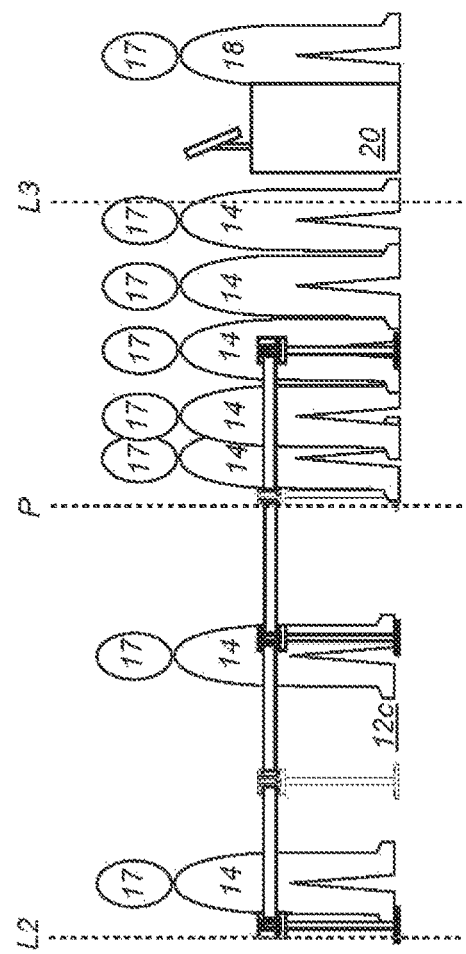
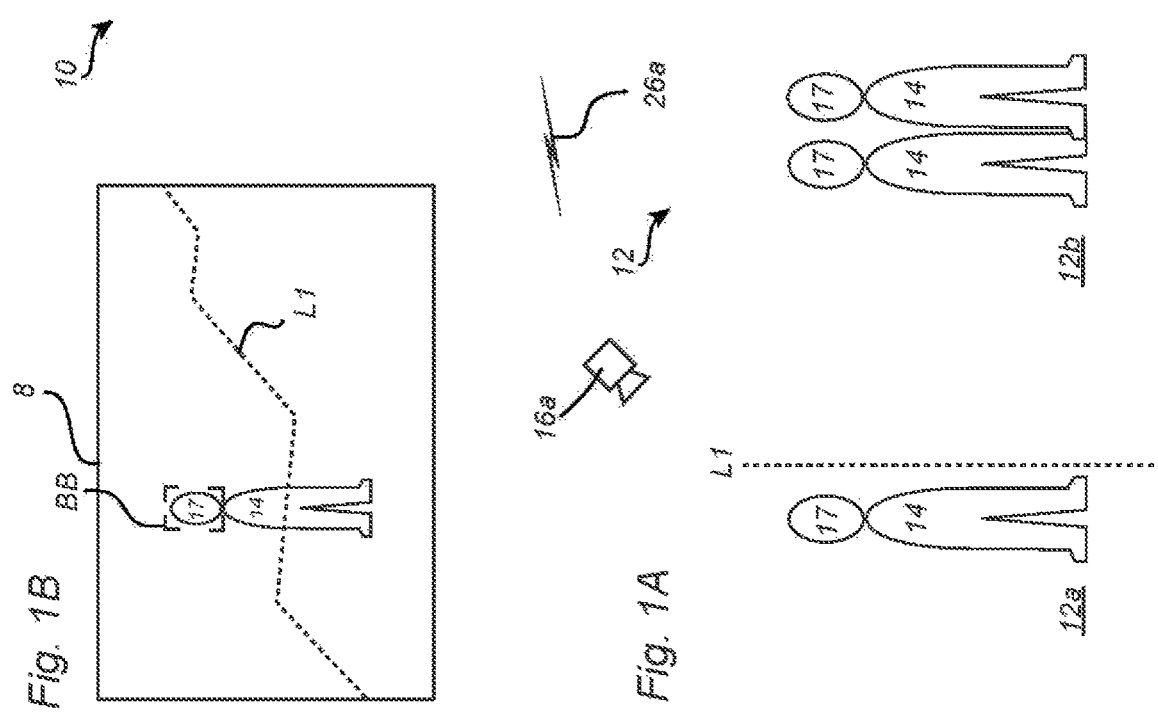
Fig. 1B
Fig. 1A

PROCESSING OF VIDEO STREAMS

FIELD OF THE INVENTION

The present invention relates to processing of video streams.

BACKGROUND

Video analytics systems are deployed for a wide range of applications. For example, video analytics-based queue management systems may be used for keeping track of and predict queuing times in stores, at public events, and in public transportation facilities such as airports, and for dynamically allocating staff in such situations.

Video analytics is computationally demanding; it may require high-performance processing equipment and high-capacity storage. Moreover, at the time of launching a video analytics system, the exact end-applications and/or possibilities of data extraction are often not known; these will typically crystallize by the end of a test period, and may even change during the lifetime of a video analytics system installation. Therefore, it may be useful to store all video streams at least during a lead-in period, or even continuously later, in order to meet future data extraction needs on past data.

However, storing data streams typically in dozens of cameras, typically in high-definition resolution, requires significant resources to store data. For local analysis, this requires significant local storage capacity, which in many cases requires installation of local resources. Online analysis consumes remote storage and bandwidth, and in some cases, bandwidth may be insufficient to transmit video streams of dozens of HD (high-definition) cameras. In addition, in many cases, the user of a video analytics system may be reluctant to pass on sensitive data for online analysis. There may also be legislation governing the processing of personal data, including the storage of such data for a period of time. In order to meet several difficult boundary conditions, the processing and storage of video streams may become complicated, difficult, and expensive.

SUMMARY

It is an object of the present invention to solve, or at least mitigate, parts or all of the above mentioned problems. To this end, there is provided a computer-implemented method of processing a video stream, comprising: receiving at least one video stream depicting an object; feeding or providing the at least one video stream to at least two video processing detectors, each comprising a respective deep convolutional neural network trained to detect one or more of the object or a property of the object; for each of said at least two video processing detectors, receiving a respective stream of object lightweight data records from the respective video processing detector, the stream of object lightweight data records generated based on the respective detection, and representing a property of the object; and feeding or providing at least one stream of object lightweight data records to at least one context detector configured to perform a secondary detection based on object lightweight data of the stream of object lightweight data records. The detections of the at least two video processing detectors may be scheduled by a task-graph scheduler. By organizing and scheduling video processing detections in a task-graph, detections may be run in parallel, while efficiently keeping track of interdependencies between different detections in a complex detection environment. The video processing detectors may be run on a hardware specifically adapted for the purpose, such as a GPU (graphics processing unit) or a TPU (tensor processing unit). As used herein, the term "lightweight data" comprises data of a size at least two orders of magnitude less than the data of a video frame.

According to embodiments, the task-graph scheduler may schedule when and/or how the the at least one video stream is fed or provided to and from the video processing detectors based on a task-graph received from a configuration input, the task-graph defining interdependencies of the detections made by the video processing detectors. In this manner, complex video processing sequences involving many steps may be conveniently defined. The configuration input may define the task-graph in a serialization format, for example as human-readable text.

According to embodiments, the at least one video stream may comprise two or more video streams, wherein the task-graph scheduler may organize the respective video processing detections of each of the two or more video streams in a respective task-graph. Thereby, parallel processing of multiple video streams may be accomplished. Each task-graph may be assigned its own set of video processing detectors, such that each task-graph is run on a separate set of video processing detector instances. This may increase the overall detection speed, since the need for switching between video image datasets to be processed is reduced. Each task-graph may be run as a separate process thread, and multiple process threads, each corresponding to a respective task-graph, may be run in parallel threads in a single process.

According to embodiments, each video stream of the at least one video stream may depict two or more objects, wherein the task-graph scheduler may be configured to incorporate a respective task-graph branch for each of the two or more objects. Thereby, two or more detected objects may be efficiently analyzed in parallel. According to embodiments, each video processing detector may be run in a separate thread. Alternatively, the task-graph scheduler may process the two or more objects consecutively in an iterative process.

According to embodiments, the at least two video processing detectors may comprise a first video processing detector comprising a first respective deep convolutional neural network trained to detect one or more of the object or a first property of the object, and a second video processing detector comprising a second respective deep convolutional neural network trained to detect a second property of the object, wherein the second detector may detect the second property of the object based on lightweight data from the first video processing detector.

According to embodiments, the detections of the context detectors may be scheduled according to a dependency graph received from a configuration input. The dependency graph may be a combined dependency graph encompassing interdependencies of video processing detections as well as context detections. According to an embodiment, the detections of the context detectors may be scheduled by the task-graph scheduler defined above. According to another embodiment, context detection interdependencies are managed separately from the task-graph scheduler managing the video processing detections. When receiving video streams from multiple inputs, and/or when receiving streams of object lightweight data records from multiple video processing detectors, context detections may be conditioned by having received video and/or lightweight data record streams originating from multiple sources, which may be available out of synchronization with each other.

According to embodiments, the at least two video processing detectors may be run in a single process on a GPU (graphics processing unit), and feeding or providing the at least one video stream to at least two video processing detectors may comprise writing to a GPU memory shared by the first and second video processing detectors. This minimizes data transfer and context switching, which will provide for significantly increased speed and substantially better use of resources. By way of example, a typical single GPU may handle about 20 parallel video streams using only 8 Gb of on-chip video memory.

According to embodiments, the at least one stream of object lightweight data records may be fed to the at least one context detector via a message-queuing middleware. Thereby, video stream reception and object/property detection may be decoupled from the context detection, which increases system resilience by enabling the property detection to continue regardless of any temporary disruptions in the operation of the context detector(s), and vice versa.

According to embodiments, the computer-implemented method may further comprise: receiving the video stream via a transfer protocol; and re-packaging the video stream to a stream of video frame records, each video frame record representing an integer number of video frames. By way of example, the video stream may be received as an RTP (real-time transport protocol) payload. Transfer protocols typically divides each video frame into smaller packages. Re-packing the payload may comprise receiving a plurality of transfer protocol packages, and combining the transfer protocol packages to form a video frame. According to a particularly efficient example, each video frame record may represent one single video frame. The video frames may be encoded in e.g. H.264 (also known as AVC, "Advanced Video Coding") or H.265 (also known as HEVC, "High Efficiency Video Coding"). The encoding may be maintained after re-packaging. Alternatively, the video frames may be decoded, such that each video frame record becomes self-contained in that it fully represents the entire picture of a video frame, or the entire content of a region of interest (ROI) of a video frame, without having to depend on a preceding key frame.

According to embodiments, the computer-implemented method may further comprise: feeding or providing the stream of video frame records to the message-queuing middleware. An exemplary message-queuing middleware suitable for handling streams of video frames is Apache Kafka®.

According to embodiments, the computer-implemented method may further comprise the message-queuing middleware storing received streams of object lightweight data records and video frame records. For example, the message-queuing middleware may be configured to retain the received data for a retention period, which may be configurable for each stream of lightweight data records or video frame records. Alternatively, the message-queuing middleware may store a predefined number of records, which number may optionally be configurable. Object lightweight data records and video frame records may be indexed by timestamp or by the order received by the message-queuing middleware. When the used storage has reached a limit, the message-queuing middleware may be configured to automatically store the latest received records, and automatically discard the oldest records at the same rate, in the manner of a circular buffer.

According to embodiments, the computer-implemented method may further comprise reading a stream of video frame records from the message-queuing middleware at a later point in time for forensic analysis. The stream of video frame records may, for example, again be fed to one or several video processing detectors, or may be output on a display or other user interface.

According to embodiments, the computer-implemented method may further comprise providing each video frame record with a unique identity, and associating each object lightweight data record with a respective video frame record or a respective range of video frame records. By way of example, video frame records may be provided with a timestamp, and if more than one video stream is received, video frame records may be tagged with a respective video stream identity. Similarly, object lightweight data records may be tagged with corresponding timestamps and video stream identities.

According to embodiments, the at least one context detector may be implemented as a respective micro-service configured to read the stream of object lightweight data records from the message-queuing middleware, and to write a stream of context data records to the message-queuing middleware. The stream of context data records may serve as input to additional context detector(s). According to embodiments, also the task-graph scheduler(s) may be configured as one or several microservices. Each microservice may be run on a respective virtual machine, or in a respective virtual container such as Docker.

According to embodiments, the message-queuing middleware may receive respective streams of object lightweight data records from more than one task-graph scheduler. The message-queuing middleware may aggregate object lightweight data records and/or video frame records from multiple sources. Such a configuration may balance load between task-graph schedulers, which may run on separate hardware. Each task-graph scheduler may schedule its own object property detections associated with its respective video input, while still enabling composite detection based on multiple video sources via e.g. the message-queuing middleware. Such a structure may also decouple the analysis of video from different sources, such that temporary disruptions in the operation of one task-graph scheduler does not affect the other(s). Moreover, composite detections involving streams from several sources is facilitated by the aggregation of data streams in the message-queuing middleware.

According to embodiments, the computer-implemented method may further comprise: when feeding or providing an object lightweight data record to at least one context detector, discarding the video frame based on which the object lightweight data record was generated. Thereby, video will be discarded once the object lightweight data has been extracted, such that only lightweight data will remain, which simplifies storage and addresses privacy issues with video storage.

According to embodiments, the context detection may be a composite detection based on multiple instances of lightweight data records of a single stream of lightweight data records. By way of example, the context detector may be a tracker configured to track the position of an object in multiple consecutive frames of a single video stream.

According to embodiments, said context detection may be a composite detection based on instances of lightweight data records from more than one stream of lightweight data records. By way of example, the context detector may be an in-store detector configured to correlate the head-pose of clients with demographic properties such as age and gender, for example in order to correlate demographics with the amount of attention paid to advertisements or product ranges.

According to embodiments, said property of the object may be a position and/or feature vector and/or orientation of the object.

According to embodiments, the context detection belongs to the group: motion tracking of the object, re-identification of the object at different places and/or different times, and detection of the object passing a virtual line within a scene. Motion tracking may comprise e.g. tracking of gestures.

According to embodiments, the context detector may comprise a neural network trained to detect an event. For example, a person's behaviour or movement trajectory, as represented by object lightweight data and/or context data, may serve as input to a neural network trained on other persons' behaviours or movement trajectories for predicting the person's behaviour or trajectory in the near-term future. Large amounts of lightweight data and/or context detector output data are a great source for data mining in general.

According to embodiments, the object may be a person or a body part of a person.

According to embodiments, the lightweight data may represent a position and/or feature and/or orientation of a body part of the person.

According to embodiments, each of the at least two video processing detectors may comprise a respective deep convolutional neural network configured to perform a respective one of (a) head detection, (b) head-pose detection, (c) demographic detection, such as age and/or gender, (d) feature vector extraction defining the appearance of a person, such as face and/or full-body feature vector extraction, and (e) skeleton model extraction defining the full-body posture of a person.

According to embodiments, the object may be a license plate.

According to embodiments, the video stream may be uncompressed video. According to some such embodiments, the task-graph scheduler may be configured to refrain from feeding or providing the uncompressed video to any message-queue middleware.

According to embodiments, the video stream may be a stream of compressed video. Such video may be encoded in e.g. H.264, H-264 or Motion JPEG.

According to embodiments, the video stream may be fed to the at least one video processing detector in real-time.

According to embodiments, the stream of object lightweight data records may be fed to the least one context detector in real-time.

According to embodiments, the stream of object lightweight data records may be fed to the least one context detector at a later point in time for forensic analysis.

According to embodiments, the computer implemented method may further comprise: prior to feeding or providing the stream of object lightweight data records to a context detector, feeding or providing the stream of object lightweight data records to a non-volatile data storage; and retrieving the object lightweight data records from the non-volatile data storage for feeding or providing to the context detector. Thereby, additional context detections can be defined and run at a later point, long after the video frames were processed by the video processing detectors, using the object lightweight data records output by the video processing detectors.

According to a second aspect, there is provided a computer-implemented method of processing a video stream, comprising: receiving at least one video stream depicting an object; feeding or providing the at least one video stream to at least two video processing detectors, each comprising a respective deep convolutional neural network trained to detect one or more of the object or a property of the object; and for each of said at least two video processing detectors, receiving a respective stream of object lightweight data records from the respective video processing detector, the stream of object lightweight data records generated based on the respective detection, and representing a property of the object. The at least two video processing detectors may be run in a single process on a GPU (Graphics Processing Unit), and feeding or providing the at least one video stream to at least two video processing detectors may comprise writing video image data to a processing unit memory allocation which is readable by each of the first and the second video processing detectors. This minimizes data transfer and context switching, which will provide for significantly increased speed and substantially better use of resources. By way of example, a single GPU may handle 20 parallel video streams using only 8 Gb of on-chip video memory. The at least two video processing detectors may be run consecutively in a single thread, or as parallel threads in a multi-threaded process. The computer-implemented method may be combined with the features of the various embodiments of the computer-implemented methods defined further above.

According to a third aspect, there is provided a computer-implemented method of processing a video stream, comprising: receiving an encoded video stream depicting an object via a transfer protocol; re-packaging the video stream to a stream of video frame records, each video frame record having a unique identity and representing a single video frame; feeding or providing the stream of video frame records to a message-queuing middleware for storage by the message-queuing middleware in a message-queue; feeding or providing the stream of video frame records to at least one video processing detector comprising a deep convolutional neural network trained to detect one or more of the object or a property of the object; for each of said at least one video processing detector, receiving a respective stream of object lightweight data records from the at least one video processing detector generated based on the respective detection, and representing a property of the object, the stream of object lightweight data records being associated with frame identities of the respective video frame records; and feeding or providing the stream(s) of object lightweight data records to the message-queuing middleware for storage by the message-queuing middleware. The computer-implemented method may be combined with the features of the various embodiments of the computer-implemented methods defined further above. For example, again, an exemplary transfer protocol may be RTP. According to embodiments, the message-queuing middleware may be configured to keep video frame records for a relatively shorter time, and to keep corresponding object lightweight data records for a relatively longer time, said relatively longer time being longer than said relatively shorter time. According to embodiments, the object lightweight data records may be read from the message-queuing middleware by at least one context detector configured to perform a context detection based on lightweight data of the stream of lightweight data records. The at least one context detector may be implemented as a respective micro-service configured to read the stream of object lightweight data records from the message-queuing middleware, and to write a stream of context data records to the message-queuing middleware for storage and/or other purposes, such as generation of events for other applications.

Also the context data records may be associated with frame identities of the respective video frame records based on which they were generated.

According to a fourth aspect, there is provided data processing equipment configured to carry out any of the computer-implemented methods defined hereinabove.

According to a fifth aspect, there is provided a computer program product comprising instructions which, when the program is executed on a processor, carries out the methods defined hereinabove. Clearly, functionality of the computer program product may be distributed between multiple program components, which distributed between multiple processors of processing equipment across a distributed hardware platform.

According to a sixth aspect, there is provided a computer-readable storage medium having stored thereon the computer program product defined hereinabove.

It is noted that embodiments of the invention may be embodied by all possible combinations of features recited in the claims. Further, it will be appreciated that the various embodiments described for the methods according to the first aspect are all combinable with the methods as defined in accordance with the second and third aspects, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1A is a diagrammatic side view of a video analytics system according to a first embodiment;

FIG. 1B is a schematic illustration of an exemplary video frame captured by a camera of the video analytics system of FIG. 1A;

Figure 2:
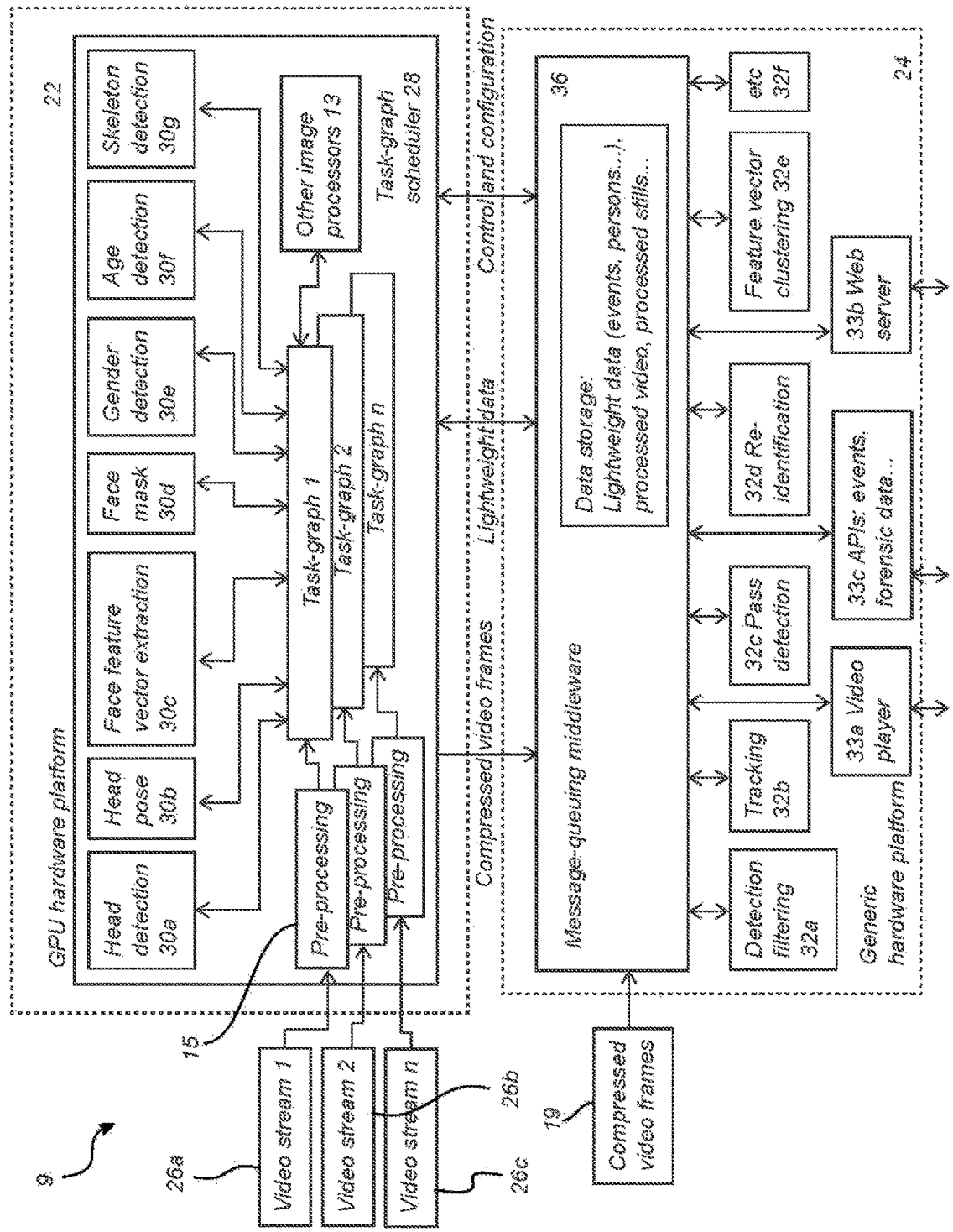
FIG. 2 is a schematic block chart illustrating the functional elements of the video analytics system of FIG. 1A, along with data flows between the functional elements, the functional elements comprising, inter alia, a message-queuing middleware.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

As pointed out in the background section, the analysis, storage and management of stored video streams may be difficult and resource intense, and the purposes of the data extraction often change during the lifetime of a video analytics system, which may cause repeated running of analysis on stored videos.

FIG. 1A illustrates a video analytics system 10 set up to monitor a public area 12 designated for serving a flow of clients 14, such as a store or the departure terminal of an airport. The video analytics system 10 comprises a plurality of cameras 16a, 16b, 16c. In the particular example, a first camera 16a monitors an entrance 12a to the public area 12, a second camera 16b monitors an intermediate area 12b, for example a store area of particular interest or a logistics bottleneck such as an escalator, and a third camera 16c monitors a queuing area 12c where clients 14 form a waiting line in order to be served by service personnel 18 at a service point 20. Each of the clients 14 has a respective head 17. Virtual pass lines L1, L2, L3 are defined in the scene monitored by the cameras 16a-c, and the video analytics system 10 may be configured to detect whenever a client passes a pass line L1-L3, for example by detecting when the respective head 17 of the client 14 passes the respective pass line L1-L3. The video analytics system 10 may also detect the position P of the starting point of the line of clients queuing to the service point 20 by determining the nearest position from the service point 20 where the density of clients 14 falls below a threshold density, as well as count the number of clients 14 in the queue, between the queue starting point P and the pass line L3 at the service point 20.

The video analytics system 10 further comprises data processing equipment 21 comprising an edge processing device 22, to which the cameras 16a-16c wirelessly transmit respective video streams 26a-c, and a cloud processing device 24 located remote from the cameras 16a-c. Clearly, the illustrated embodiment is merely an example; processing may be distributed between an arbitrary number of physical or virtual processing devices, and the processing device(s) may be located close to or far from the cameras 16a-c. The video streams 26a-c may be uncompressed, or compressed by the respective camera 16a-c in any suitable coding such as H.264 or H.265. Data processing equipment 21 may be configured to carry out the functions described herein using computer-implemented hardware and software. For example, edge processing device 22 may comprise tangible and/or non-transitory memory that includes processor executable instructions for implementing the methods described herein. Each of edge processing device 22 and cloud processing device 24 may include respective processor(s) and memory configured to implement the methods described herein for their respective functions. The processor(s) and memory may be implemented via CPU(s), GPU(s), TPU(s), other parallel processing devices used to implement neural networks (e.g., multi-core processor devices, parallel processor devices, multi-node processor devices, vector processors, and/or the like), and/or the like.

The processing equipment 21 receives video streams from the cameras 16a-16c, and performs various detections based on the received video streams as will be elucidated in the following, with reference to FIG. 2.

FIG. 2 provides a schematic overview of a video processing system 9 implemented by the processing equipment 21 (FIG. 1A). According to some embodiments, the cameras 16a-c may also perform at least some functions of the video processing system 9; hence, the data processing equipment 21 may encompass also the cameras 16a-c. According to some embodiments, the data processing equipment 21 is completely integrated within the hardware of the cameras 16a-c.

Task-Graph Scheduler

The data processing equipment 21 (FIG. 1A) runs a task-graph scheduler 28, which receives the video streams 26a-c and forwards them to various detectors 30a-g, 32a-f. Some detections may be run in parallel, and the task-graph scheduler 28 organizes the streams in respective task-graphs and schedules the detections accordingly, based on the timing of incoming video frames and available resources at the time. This enables parallel detection processes with due regard to the detections' interdependencies. The task-graph scheduler 28 runs one task-graph per video stream 26a-c, wherein each task-graph can simultaneously or consecutively use a number of different detectors. In the drawing, the third video stream 26c is designated "video stream n" to indicate that the system 9 may be configured to receive and process an arbitrary number n of parallel video streams.

The task-graph scheduler 28 may typically be run on a hardware platform equipped with one or several graphics processing units, GPUs, for processing the received video streams 26a-c. It may be convenient to run the task-graph scheduler 28 on the edge processing device 22, close to the cameras 16a-c. For maximum efficiency, one singe task-graph scheduler 28 may typically run on the GPU. If a multi-GPU hardware is used, additional instances of task-graph schedulers may beneficially be run on any respective additional GPUs in a one-to-one relationship.

A plurality of video streams 26a-c are received by the task-graph scheduler 28. The task-graph scheduler 28 may simultaneously receive an arbitrary number n of video streams 26a-c; when applied to the deployment scenario illustrated in FIG. 1A, the task-graph receives one respective video stream 26a-c from each camera 16a-c. The video streams 26a-c may be uncompressed, or may be encoded in any suitable format such as H.264 or H.265, and may be carried as an RTP (real-time transport protocol) payload from the cameras 16a-c (FIG. 1A). Upon receipt, the task-graph scheduler 28 may pre-process the video streams. By way of example, for each video stream 26a-c, the task-graph scheduler 28 may combine multiple consecutive RTP packages, each package representing only a fraction of a video frame, to self-contained video frame records each representing a respective full video frame. Video frames may be key frames, which contain full picture information, or intermediate frames containing inter-frame information indicating differences from the latest preceding key frame. The task-graph scheduler may combine inter-frame prediction information (temporal coding) of non-key frames with the latest preceding key frames of the respective video streams 26a-c to generate additional video frame records containing full picture information, i.e. corresponding to key frames. Alternatively, non-key frames may be associated or bundled with the latest preceding key frame. Each video frame record may be tagged with a video stream identity identifying the respective video stream 26a-c from which it was generated, and a timestamp identifying the temporal order of the video frame records.

Pre-processing may also comprise e.g. downscaling of high-resolution video, cropping down video frames to a region of interest, and/or sampling of only a sub-set of received frames for further analysis. Such sampling may be configured during setting-up of the system; by way of example, the pre-processing may be configured to tag one third of the frames for subsequent image processing, while the remaining two thirds of the frames may be either stored to enable later analysis, or discarded.

During pre-processing, the RTP payload of each received video stream 26a-c is re-packaged into a respective stream of video frame records, each video frame record representing a single video frame. The streams of video frame records may optionally be fed to a message-queuing middleware 36, which will be described in more detail further below. As indicated in FIG. 2, the video frames encapsulated in the streams of video frame records fed to the message-queuing middleware 36 are preferably compressed. Any encoding in e.g. H.264, H.265 or Motion JPEG may be maintained, and the re-packaging may comprise encapsulating the video frames in video frame records, and providing each video frame record with a timestamp and/or a video stream identifier. All records carrying a non-key frame may comprise an additional index key or timestamp indicating the last preceding key-frame. In order to facilitate distinguishing the video streams 26a-c from each other, each stream of video frame records may be fed to a respective message-queue of the message-queuing middleware.

After having pre-processed the respective video streams 26a-c the resulting streams of video frame records are processed by a set of video processing detectors 30a-g. The video processing detectors 30a-g perform GPU intensive processing, and therefore all of the video processing detectors 30a-g are run on the GPU hardware platform 22, which is typically an edge device. It may be beneficial to run all video processing detectors 30a-g in the same single process on a respective GPU, such that each video frame record need be written to the GPU memory only once. It may also be beneficial to run the video processing detectors 30a-g in the same process as the task-graph scheduler 28 and/or any pre-processor(s) 15, to even further reduce inter-process communication involving moving data between different memories. Examples of hardware suitable for deep CNN processing are the NVidia Jetson edge computer series, which are provided with both CPUs and GPUs. The task-graph scheduler 28 and the video processing detectors 30a-g may be executed in e.g. a Docker container on a GPU.

FIG. 2 illustrates seven exemplary video processing detectors: Head detection 30a, head-pose detection 30b, face feature vector extraction 30c, face mask detection 30d, gender detection 30e, age detection 30f, and skeleton detection 30g. All of those video processing detectors 30a-g incorporate a deep convolutional neural network, CNN, trained to detect a respective property of a person 14 (FIG. 1A) present in a video frame. The CNN(s) may include an input layer, one or more hidden layers, and an output layer. Each layer may include one or more nodes. The layers may be fully connected, less than fully connected (e.g., receptive), pooling, etc. Additional video processing detectors that may benefit from GPU processing, and hence may be candidates for being run within the task-graph scheduler 28, may process image frames without the use of a CNN. Such additional video processing detectors may be, for example, image resizing, image rotation, and image cropping. Other additional video processing detectors may involve the use of deep CNNs, for example full body feature vector detectors trained to generate individual feature vectors of persons 14 based on full body characteristics.

Figure 3:
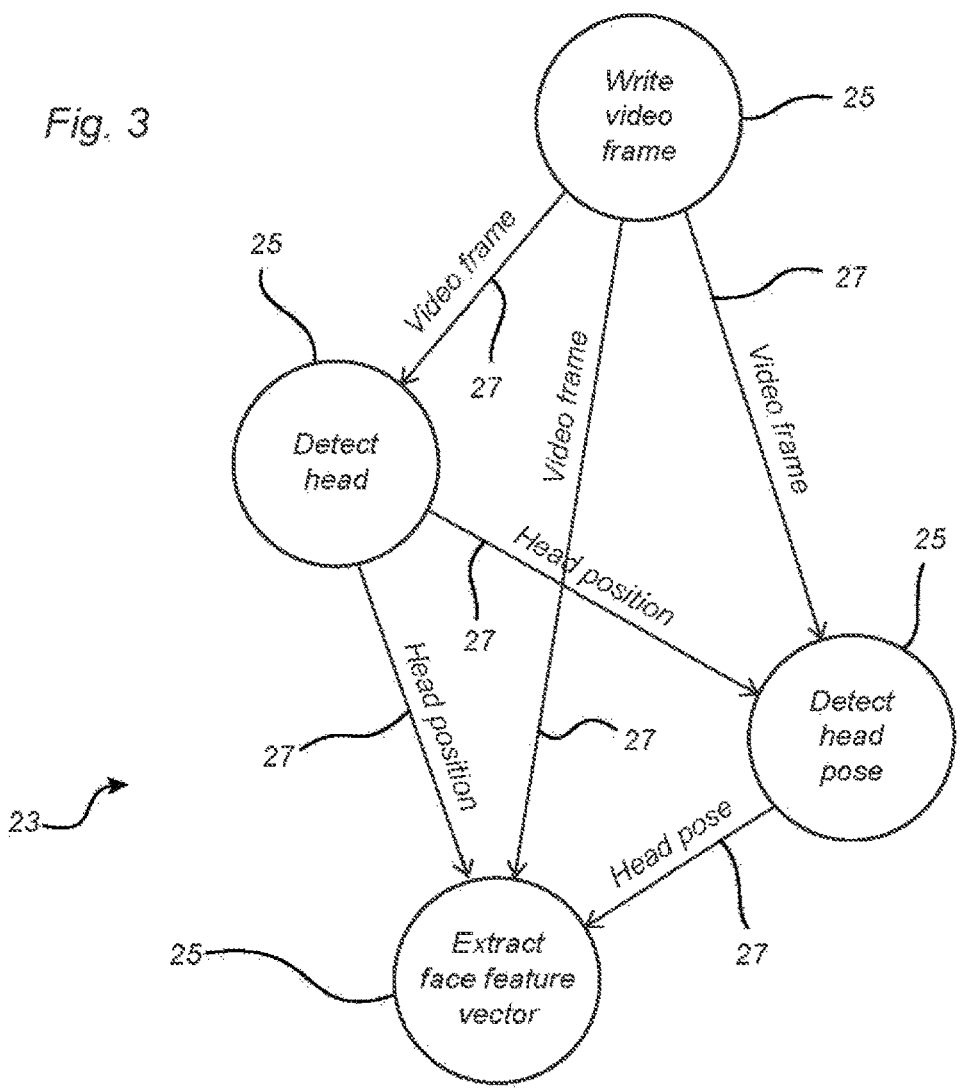
FIG. 3 is a task-graph illustrating task interdependencies in a first detection scenario of the video analytics system of FIG. 1A.

Some video processing detectors take the output of other video processing detectors as input. FIG. 3 is a task-graph 23 illustrating the dependencies of a series of operations resulting in the extraction of a face feature vector from a video frame depicting a person 14 (FIG. 1A). In order to detect the face feature vector, the existence and position of a head 17 (FIG. 1A) needs to be determined. Face detection is also conditioned by the head 17 being in a head-pose showing the face, and even if the face is visible, the head-pose influences the extraction of the face feature vector. The head-pose can only be determined if the head 17 has been detected and its position is known. All operations depend on having access to a memory allocation containing the video frame; in the illustrated example, the memory allocation is shared between the video processing detectors 30*a-c*. The task-graph scheduler 28 executes the task-graph 23 in a way that respects the data dependencies, and where possible and beneficial, multiple independent tasks can be run simultaneously. The task-graph 23 may be defined by an operator in a human-readable data serialization format such as JSON, protobuf, XML or the like, which may be provided to the task-graph scheduler 28 e.g. as a data file. The data serialization format may define processing nodes 25, their respective output data formats and required input data formats, and their respective input data sources or dependencies. Thereby, also the edges 27 of the task-graph 23 will be implicitly defined.

Figure 4:
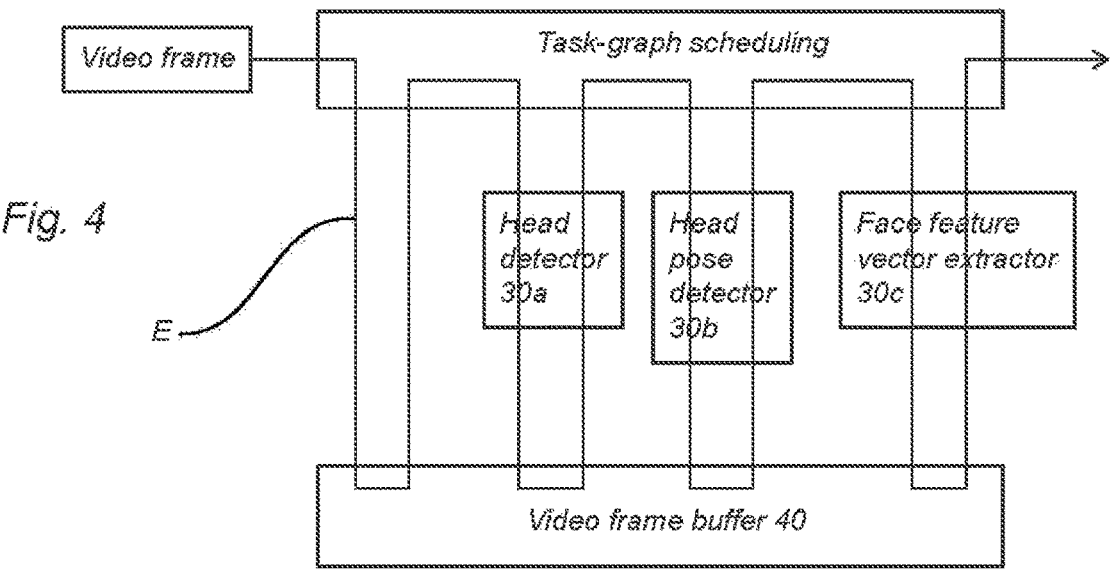
FIG. 4 is a flow chart illustrating the scheduling of tasks of the task-graph of FIG. 3.

FIG. 4 illustrates a simple scheduling example of an execution of the task-graph 23 of FIG. 3. The task-graph 23 is executed by the task-graph scheduler 28 of FIG. 2, and its execution is represented by a single directional line E. The task-graph scheduler 28 may process a stream of video frames received from e.g. a camera 16*a* (FIG. 1A). The video frames may have been pre-processed as described above. First, the task-graph scheduler 28 (FIG. 2) writes a first incoming video frame to a video frame buffer 40 of the GPU. Thereafter, the task-graph scheduler 28 initiates detection of a head 17 within the video frame. The head detector 30*a* processes the video frame of the video frame buffer 40 in a deep convolutional network trained to detect heads, and returns an object lightweight data record comprising lightweight data representing a detected object, and more specifically, position information indicating the position of a person's head within the video frame of the video frame buffer 40. Referring back to FIG. 1B, which illustrates an exemplary video frame 8 detected by the first camera 16*a*, the position of a detected head 17 may typically be described by the corner coordinates of a rectangle BB, often referred to as "bounding box", enclosing the head. Alternatively, if no head was detected, no further video processing detections are made in the video frame 8, and the task-graph scheduler 28 may proceed with processing the next incoming video frame from the camera 16*a*.

On the condition that a head 17 was detected, the task-graph scheduler 28 initiates detection of the three-dimensional head-pose of the detected head 17 by feeding or providing the position information of the object lightweight data record generated by the head detector 30*a* to the head-pose detector 30*b*. The head-pose detector 30*b* processes a portion of the video frame in the video frame buffer 40, which portion corresponds to the video frame area within the bounding box, in a deep convolutional network trained to detect three-dimensional head-pose, and returns an object lightweight data record indicating the three-dimensional head-pose of the detected head 17.

On the condition that the detected head-pose is suitable for face recognition, i.e. the face of the head 17 is turned towards the camera 16*a*, the task-graph scheduler 28 initiates face feature vector extraction of the detected head by feeding or providing the position information of the object lightweight data record generated by the head detector 30*a*, and the three-dimensional head-pose information of the lightweight data record generated by the head-pose detector 30*b*, to the face feature vector extraction detector 30*c*. Alternatively, if the detected head-pose is deemed unsuitable for face feature vector extraction, no further object property detections are made in the video frame, and the task-graph scheduler 28 may proceed with processing the next incoming video frame.

But again, if the detected head-pose is deemed suitable for face feature extraction, the face feature extraction detector 30*c* processes the bounding-boxed portion of the video frame in the video frame buffer 40 in a deep convolutional network trained to extract a face feature vector, and returns a record of object lightweight data representing a face feature vector of the detected head 17.

In the very simple example of FIG. 4, video processing detectors are run sequentially. Each subsequent video processing detection is gated by the condition that a preceding video processing detection has been carried out, and takes the output of the preceding video processing detection as input. All object property detections are performed on the image data of the same video frame buffer, which is shared between the video processing detectors 30*a-c*.

Figure 5:
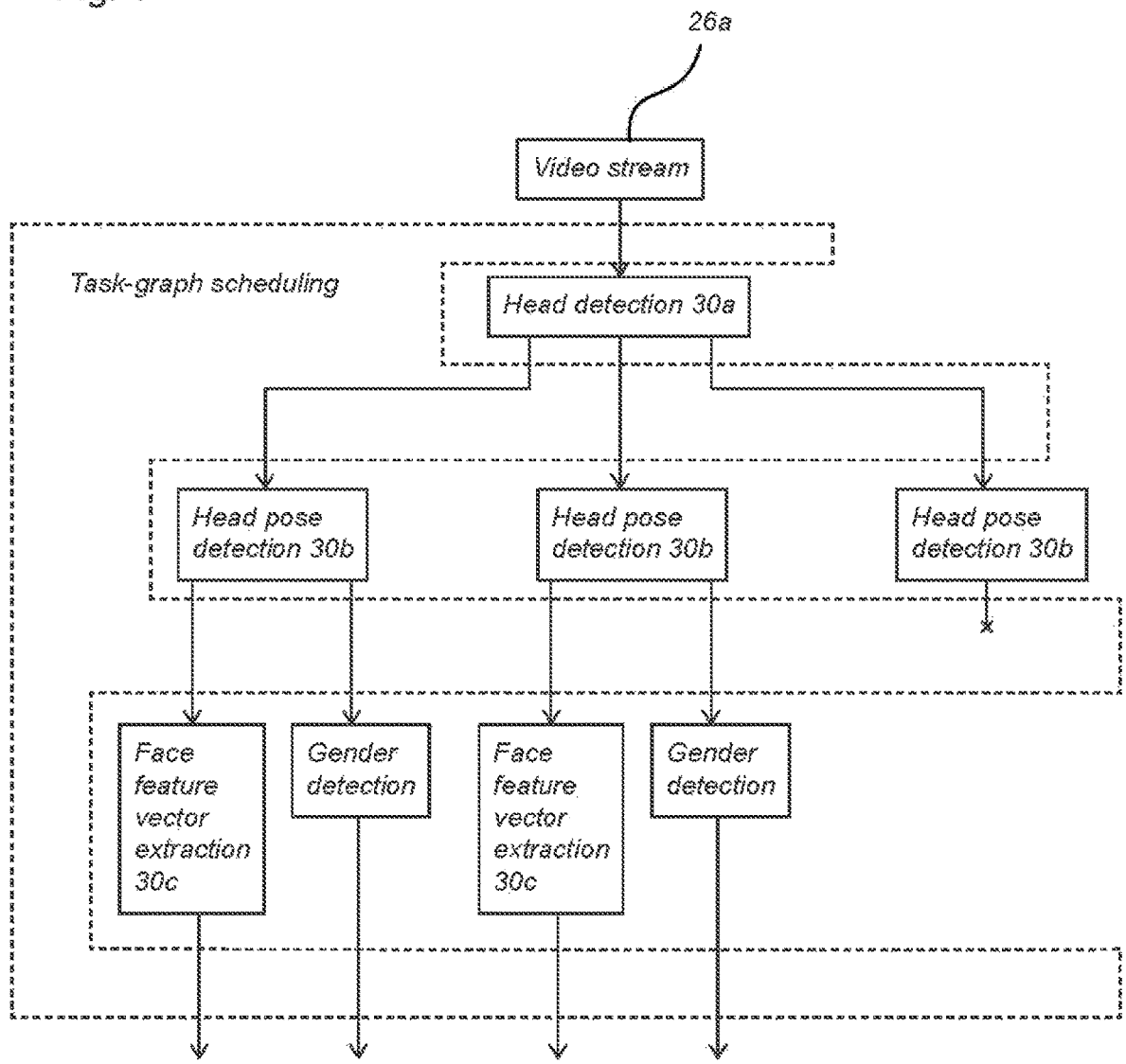
FIG. 5 is a flow chart illustrating the scheduling of tasks in a second detection scenario of the video analytics system of FIG. 1A.

FIG. 5 illustrates a slightly more complex scenario, wherein parallel video processing detections are organized in a directed bipartite task-graph. The parallel detections may be run in parallel threads of the same process, or may be scheduled consecutively in a single thread if so required by the CPU or GPU being used. The example illustrates the collection of face feature vectors and demographic data (gender) of multiple persons within the field of view of the camera 16*a* of FIG. 1. Again, the task-graph scheduling processes a stream 26*a* of video frames received from e.g. a camera 16*a*, wherein the video frames may have been pre-processed as described above. First, the task-graph scheduler 28 (FIG. 2) writes a first incoming video frame to a video frame buffer 40 (FIG. 3) of the GPU. Thereafter, the task-graph scheduler 28 initiates detection of heads 17 within the video frame. The head detector 30*a* processes the video frame of the video frame buffer 40 in a deep convolutional network trained to detect heads 17, and returns one or several object lightweight data records comprising position information indicating the positions of a plurality of persons' heads within the video frame of the video frame buffer 40, which positions may typically be described by the corner coordinates of the bounding boxes BB enclosing the heads 17.

For each detected head, the task-graph scheduler 28 initiates detection of the three-dimensional head-pose of the respective detected head 17 by feeding or providing the respective bounding box information of the respective object lightweight data record generated by the head detector 30*a* to a respective head-pose detector 30*b*, each of which may run in a separate process thread. Each head-pose detector 30*b* processes a respective portion of the video frame in the video frame buffer 40 (FIG. 3), which portion corresponds to the respective video frame area within the respective bounding box, in a deep convolutional network trained to detect three-dimensional head-pose, and returns a respective object lightweight data record indicating the three-dimensional head-pose of the respective detected head.

For the detected heads facing the cameras, the task-graph scheduler 28 initiates face feature extraction of the respective detected head 17 by feeding or providing the respective position information of the object lightweight data record generated by the head detector 30a, and the respective three-dimensional head-pose information of the object lightweight data record generated by the respective head-pose detector 30b, to a respective face feature vector extraction detector 30c. The face feature vector extraction detectors 30c process the respective bounding-boxed portions of the video frame in the video frame buffer 40 in a deep convolutional network trained to extract a face-feature vector, and returns respective object lightweight data records representing respective face-feature vectors of the respective detected heads. After the video frame has been fully analyzed, the task-graph scheduler 28 may proceed with writing the next incoming frame to the video frame buffer.

By running all three video processing detectors 30a-c in the same OS (operating system) process, they can access the same memory areas allocated by the OS for the process. For a typical GPU, inter-process sharing of memory allocations is not possible, whereas the grouping of multiple video processing detectors 30a-c in a single process speeds up the provision of video frames to the consecutive video processing detectors 30a-c substantially.

Video Processing Detectors

Referring back to FIG. 2, some detections are made by directly processing or analyzing the image of a video frame as such. Detectors 30a-g making such detections are termed video processing detectors herein. Video processing detectors 30a-g are most efficiently run on a GPU or a TPU, which are designed for efficient processing of large amounts of image and video data. Some GPUs and TPUs may also have native support for efficiently running deep CNNs.

A typical output of a video processing detector 30a-g may be lightweight data about any objects depicted in a video frame, such as the existence or number of objects, the location of any detected object within a video frame, or the orientation, shape or appearance of a detected object. Such detections are efficiently made by a deep CNN. The record of object data produced by a video processing detector 30a-g is, compared to the original video frame, lightweight in the sense that the data is orders of magnitude smaller than the original image data. Hence, the object data produced by a video processing detector is termed object lightweight data, and it is delivered by the video processing detector as an object lightweight data record. Object lightweight data records may also contain information identifying the video frame based on which it was produced, for example a camera or video stream identity and a timestamp.

The first video processing detector to operate on a received video frame 8 (FIG. 1B) is typically an object detector configured to detect the presence and position within a video frame of an object. If no object is detected, no further object analysis needs to be made, and if one or several objects are detected, the positions of all objects within the video frames may serve as input to subsequent video processing detectors. Typical object detectors may be, for example, head detectors, skeleton detectors, vehicle detectors, and license plate detectors. Object detection is one of the most demanding video processing operations, and processor load may be moderated by decreasing the video frame rate, for example by performing object detection on every n:th video frame, where n may typically be an integer between two and ten.

A few examples of video processing detectors aimed specifically at detecting humans are given below.

The head detector 30a identifies the head 17 of a person 14 on a video frame and may save the position of a bounding box BB (FIG. 1B) of the identified head. This feature can be used to detect if people are present in an area of the video frame. A head detector 30a may detect a plurality of heads 17 in a single video frame, and may produce an object lightweight data record indicating the positions of a corresponding plurality of bounding boxes BB.

The head-pose detector 30b detects the three dimensional orientation of the head of a person on a video frame. The orientation of the detected head 17 may be saved as three angles in degrees: yaw, pitch, and roll. The head-pose detector 30b may take the head position determined by the head detector 30a as input. The head detector 30b may provide low level data for attention detection, i.e. for determining where a detected person is looking. It may also serve as a filter to enable refraining from other detections, such as age or gender detection, face mask detection, or face feature vector extraction, on detected heads where the head-pose is such that those other detections may be expected to have little chance of success.

The face feature vector extraction detector 30c converts facial images of a person to an abstract representation embodied as a face feature vector, which identifies the characteristics and appearance of a face. Face feature vectors cannot be converted back to images; however, they may serve as input data for re-identification and facial similarity search, also called lookalike search. The facial feature vector extraction detector 30c may be gated by the head-pose determined by the head-pose detector 30b, as only images of sufficient resolution, where the detected person is facing the camera, are suitable for face feature vector creation. The face feature vector extraction detector 30c may take the head position determined by the head detector 30a as input, along with the head-pose determined by the head-pose detector 30b, since the face may be pre-processed to compensate for the head-pose prior to face feature vector extraction.

A full body feature vector extraction detector (not illustrated) may operate in a similar manner, converting body images of a person to an abstract representation embodied as a body feature vector, which identifies the characteristics and appearance of a body.

A face mask detector 30d may detect whether a human face on a video frame is covered by a face mask. Similar to the face feature vector extraction detector 30c, the face mask detector 30d may be gated by the head-pose determined by the head-pose detector 30b, and may take the head position determined by the head detector 30a and the head-pose determined by the head-pose detector 30b as input.

The gender detector 30e estimates and saves the gender data of a human face on a video frame. Similar to the face feature vector extraction detector 30c, the gender detector 30e may be gated by the head-pose determined by the head-pose detector 30b, and may take the head position determined by the head detector 30a and the head-pose determined by the head-pose detector 30b as input.

The age detector 30f estimates and saves the age of a human face on a video frame. Similar to the face feature vector extraction detector 30c, the age detector 30f may be gated by the head-pose determined by the head-pose detector 30b, and may take the head position determined by the head detector 30a and the head-pose determined by the head-pose detector 30b as input.

A person's face feature vector, gender, age, or any mask, can be estimated from detections in multiple video frames to increase detection confidence.

The skeleton detector 30g, which may sometimes also be referred to as a body pose detector, detects the position of a person's body and its joints in a video frame. The object lightweight data record produced by the skeleton detector 30g represents the posture of a person's limbs and joints; it can be used for e.g. gesture interpretation, fall detection, and in many other higher level applications. A single video frame typically enables detection of a body pose in two dimensions, whereas a pair of video frames having the same timestamp, the video frames depicting the same person from two different aspect angles, may generate a three-dimensional skeleton model of the person. Skeleton detection finds applications in e.g. fall detection and attitude detection: "hands up", bowing, kneeling etc.

All of the above described video processing detectors 30a-g may efficiently be implemented by respective deep convolutional neural networks trained for the respective purposes. Each of the video processing detectors 30a-g may also produce, in their respective object lightweight data records, a detection confidence.

Even though not detectors in a strict sense, also other image processors 13 may be run on the GPU. Such other image processors 13 may include, for example, video frame resizing, video frame rotation, video frame cropping, drawing of e.g. bounding boxes around detected objects in video frames, and/or anonymizing. An anonymizer may produce as its output video frames as anonymized images or video frames, which may be stored while discarding the original, non-anonymized video. Saved video frames can be used for displaying recorded video while adhering to data privacy regulations. Because of the anonymization, those video frames cannot be used for further identification analysis, but frames may be associated with anonymous object lightweight data such as position, head-pose, age, gender, etc. An anonymizer may typically take the head position determined by the head detector 30a as input, and blur or mask the video frame subareas within any bounding boxes BB (FIG. 1B).

Context Detectors

Other detectors 32a-f apply object information received from the video processing detectors 30a-g in a context, for example by comparing object lightweight data to stored templates or to other object lightweight data, by determining whether object lightweight data match certain predetermined or dynamically set conditions, by aggregating multiple instances of object lightweight data for identifying trends or patterns, or by associating objects with each other by matching their respective object lightweight data to each other. Such detectors are termed context detectors herein. Typical context detections may be, for example, determining whether an object is within a predetermined area of a video frame, tracing the positions of an object over time, and re-identifying an object which appears in different video frames, which may be received from the same or different video streams 26a-c. Context detections do not involve processing the video frame as such, but instead makes detections based on the lightweight data produced by video processing detectors 30a-g. Therefore, context detectors 32a-f can be efficiently run on almost any generic hardware platform having data processing capabilities, such as a generic CPU. Context detectors 32a-f can also take context data records output by other context detectors 32a-f as input.

A few examples of context detectors aimed specifically at detecting humans are given below.

The detection filter 32a is configured to filter detections according to the functional requirements of another application. The filtering criteria may be, e.g., whether a detection reaches a detection confidence limit, and/or whether a detection was made within a region of Interest (ROI) of the video frame. A ROI may be defined by one or more areas defined by polygons. Each polygon may be positive or negative, wherein the sign may determine whether detections in the polygon are included or excluded by the filter. This allows for precise and versatile filtering. If no positive areas are set, the whole video frame is the area of detection. ROI definitions and confidence thresholds may be predetermined, or may be taken as input to the detection filter 32a. ROI polygons can be configured manually e.g. by drawing in a configuration interface. Different ROIs may be given different confidence threshold levels. Input may be object lightweight data records from the head detector 30a, the object lightweight data records defining positions of detected objects, and output may be context data records defining positions, properties or identities of a filtered, reduced set of detected objects.

The tracker 32b defines routes based on the head positions determined in two or more consecutive head detections. If a head detection is within a threshold distance from a preceding head detection, a track is formed between the two. Input may be consecutive object lightweight data records from the head detector 30a, the object lightweight data records defining positions of detected objects, and output may be context data records defining tracks between temporally separated detections. For all subsequent head detections that are within the distance threshold, the track may be extended with new entries. Besides the path of movement, a track can also enable calculating for how long a tracked person stays in an area of interest. Geometric and temporal distance thresholds for detecting a track may be configured.

The pass detector 32c produces context data records indicating a pass event whenever a track intersects a pass line L1-L3 (FIG. 1A). Thereby, the pass detector 32c may facilitating detection of when an individual enters or leaves an area of interest. The context data may also incorporate identity information identifying the object that passed the pass line, and a pass line identity identifying the pass line that was passed. Pass detection finds applications in e.g. people counting at entrance/exit of an area for e.g. estimating a number of people within the area, passer-by counting, etc.

The re-identifier 32d compares received feature vectors or clusters of feature vectors with feature vectors stored in a feature vector database, and finds reappearances. If a received feature vector or cluster is unknown to the system, it is registered in the feature vector database. If the received feature vector or cluster is already registered, it is re-identified by the re-identifier 32d, which generates a match. Output from the re-identifier may be a context data record identifying video streams and timestamps of earlier occurrences of the re-identified person, and/or a proposed identity of the identified person as determined by querying the feature vector database. For each pair of feature vectors or clusters, a similarity score may be produced, the score representing the likelihood that the two feature vectors or clusters represent the same individual. The re-identifier 32d finds applications in e.g. access control in entrance systems, multi-camera tracking, dwell time and client track statistics in e.g. stores, waiting time analysis in queue management, returning customer analysis, etc.

The feature vector clusterer 32e creates clusters of its input feature vectors based on similarity. The feature vector clusterer 32e maintains a database for storing feature vector clusters.

Additional context detectors 32f may include, e.g., object and person counters and various alerting logics, i.e. services configured to output an alert in the event that a set of detected conditions are fulfilled.

Obviously, in a complex scenario comprising several interdependent detectors, the use of a task-graph scheduler 28 for scheduling interdependent detections facilitate detection management.

Message-Queuing Middleware

Referring back to FIG. 2, the object lightweight data records generated by the video processing detectors 30*a-g* are pushed to respective message-queues of the message-queuing middleware 36. Each video processing detector 30*a-g* pushes its output records to a respective object lightweight data record message-queue managed by the message-queuing middleware 36, such that each message-queue receives a respective stream of object lightweight data records in the order the respective frames 8 have been received and processed by the respective video processing detectors 30*a-g*. Each context detector 32*a-f* may be run as a respective micro-service, and may read streams of object lightweight data records from the respective message-queues in the order of the respective queues for sequential processing. The context data records generated by the context detectors 32*a-f* are pushed to context data record message-queues, which are also managed by the message-queuing middleware 36. This enables asynchronous communication between data record producers and data record users, such that the senders and receivers of the data records do not need to interact with the message-queue at the same time. In this context, each detector 30*a-g*, 32*a-f* may operate both as a data record producer, producing object lightweight and/or context data records for use by other detectors 30*a-g*, 32*a-f*, and as a data record user, using object lightweight and/or context data records produced by other detectors 30*a-g*, 32*a-f*. It is an inherent feature of message-queues that data records placed onto the respective queues are stored at least until the data record user retrieves them; hence, the message-queuing middleware 36 provides a safe and resilient means of managing data flows in a video analytics system 10.

The message-queues of the message-queuing middleware 36 may also be individually configured to persistently maintain the data records in the respective queues, without removing the messages from the respective queues once they have been read by their respective data record users. In this manner, all streams of records received by the respective message-queues may be maintained for forensic analysis. This may be particularly useful in the case of video frame record streams, wherein the frames of the original video will be persistently stored in a message-queue for later analysis. The same may apply to object lightweight data records, such that there will be no need, during any later analysis, to repeat video processing detections that have already been made.

As indicated above, the message-queuing middleware 36 may receive and store streams of video frame records from the respective video streams 26*a-c* in respective message-queues. Thereby, the video stream storage inherits all benefits of message-queueing, including an interface specifically adapted for reading records in a consecutive order, along with e.g. the ability to set a retention period. For example, the message-queuing middleware 36 may be configured to keep video frame records for a relatively shorter time, for example two weeks, and to keep all corresponding object lightweight data records for a relatively longer time, for example a year. As an alternative or supplement to receiving streams of video frames records from the task-graph scheduler 28, video frame records may be received from another source 19, e.g. directly from the cameras 16*a-c* (FIG. 1A) or from a process reading video frames from a file system (not illustrated).

Data or video frame record users may start reading records from the respective message-queues at a selected starting index/serial number or starting timestamp, and keep reading consecutive records from the respective message-queues indefinitely, as a potentially never-ending stream of records, or until a selected stop index/serial number or stop timestamp has been reached. In this manner, all streams of video frames records, object lightweight data records, and context data records may be read in the respective order generated by the respective producers, i.e. the video streams 26*a-c* and the detectors 30*a-g*, 32*a-f*.

The message-queuing middleware 36 provides a unified platform for the communication between microservices, and makes it easy to store and/or forward live video streams frame by frame just like any kind of data, and store and/or forward the lightweight data output from the microservices (object lightweight data and composite detectors). The message-queuing middleware 36 may also organize automatic distribution of HW and SW resources for the micro-services. The latter makes it easy to implement redundant video analysis, because if one microservice crashes, the message-queuing middleware may immediately transfer the task to another instance of that microservice in order for the analysis to stay continuous.

The use of a message-queuing middleware 36 has various additional benefits that are intrinsic; for example, a typical message-queuing middleware has built-in resilience and redundancy which guarantees that if you put a message on the queue, it can be retrieved at a later point, also of the service has been stopped. The order between messages is automatically maintained.

Various message-queuing middleware exist. One exemplary message-queuing middleware which is well suited for the purposes described herein is Apache Kafka®. Kafka® automatically manages at least one timestamp per message, and allows the queues to be queried by time, i.e. enables a queue to be consecutively read from a selected starting time. It also allows messages to carry payloads in binary data format, which is suitable for video frames, and has the ability to persistently store queued messages for a configurable retention period, potentially indefinitely. Kafka® can be distributed on different servers and/or in a cloud, and its storage layer can manage replicas on different servers automatically. For the sake of completeness, also other message-queuing middleware 36 may have all or subsets of those benefits.

As pointed out above, the context detectors 32*a-f* (FIG. 2) may be configured as microservices. Thereby, various instances of context detectors 32*a-f* may be decentralized, independently deployable, and fault-tolerant. Also the task-graph scheduler 28 may be configured as a micro-service, which may read video frame records from and write object lightweight data records to message-queues of the message-queuing middleware 36 substantially independently of all other ongoing processes. Instances of task-graph schedulers 28 may be deployed and re-deployed as needed, and in the event of execution errors in a task-graph scheduler 28, it may be re-started without substantial loss of function or video data—in particular if reading frames from a message-queue. Object lightweight data records 40*a* and context data records 40*b*, as well as metadata of video frame records, may be in a typed format such as JSON (JavaScript Object Notation) or protobuf to maximize platform independence.

Serialization of object lightweight data records 40a and context data records 40b may be e.g. JSON.

Similar to the task-graph 23 of FIG. 3, also the context detections may be defined by a set of bipartite task-graphs, which may be provided to the micro-services in a human-readable data serialization format such as JSON, protobuf, XML or the like. Again, the data serialization format may define processing nodes, their respective output data formats and required input data formats, and their respective input data sources or dependencies. The configuration may be expressed in text format in a configuration record. Configuration records may be pushed to one or several configuration message-queues of the message-queuing middleware 36, which configuration message-queue(s) may be continuously or intermittently read by the detectors/microservices 28, 30a-g, 32a-f. Thereby, microservices may continuously re-configure themselves, and newly started instances of microservices may automatically configure themselves upon start. Configuration records pushed to the message-queuing middleware 36 may have the same typed format as the object lightweight data records 40a and context data records 40b, in order to facilitate co-storage of configuration records with the resulting data records. Thereby, settings used for generating a particular output may easily be traced back. The task-graph configurations defining the respective task-graphs for the video processing detections and the context detections may be nested in a superordinate task-graph configuration.

Figure 6:
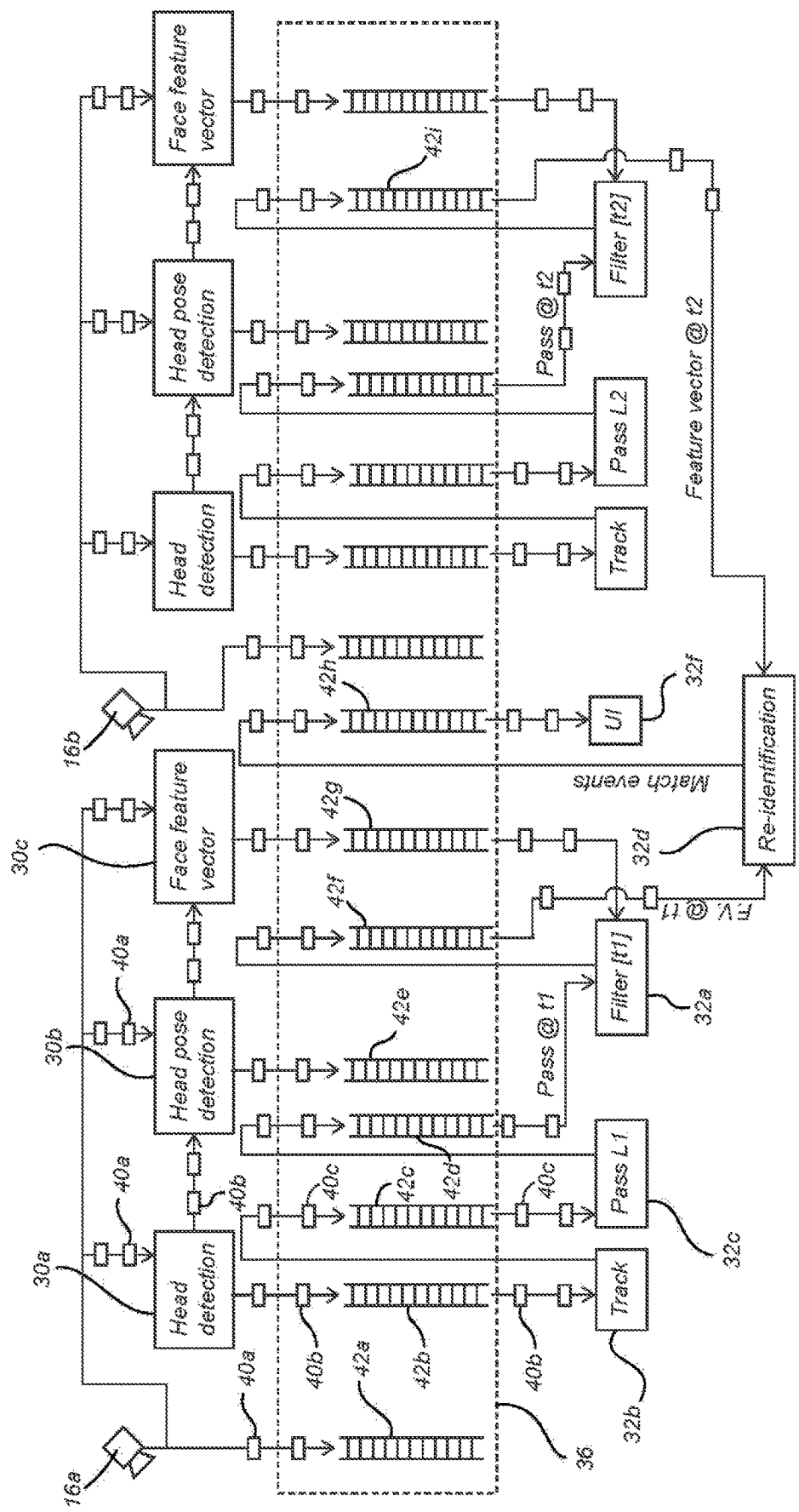
FIG. 6 is a flow chart illustrating data flows to and from message-queues of the message-queuing middleware of FIG. 2 in a third detection scenario of the video analytics system of FIG. 1A.

The flexibility of the video analytics system 10 enables configuring a certain detection in several different ways. FIG. 6 illustrates a potential configuration of the video analytics system 10 of FIGS. 1-2 for detecting people 14 passing line L1 (FIG. 1A), and generating an event when the same persons 14 pass line L2. This may be used for e.g. keeping track of which persons 14 reside in the area between L1 and L2. For the sake of simplicity and clarity, only the data flow generated by the video stream 26a (FIG. 1A) from the first camera 16a will be described in detail. The first camera 16a feeds a video stream encoded as e.g. a H.265 stream, carried by RTP/RTSP (carried by RTP, real-time transport protocol, controlled by RTSP, real-time streaming protocol), to the edge processing device 22. The edge processing device 22 unpacks the H.265 video frames, and encapsulates them in respective video frame records 40a which are pushed to a first video frame message-queue 42a of the message-queuing middleware 36. The edge processing device 22 also performs head, head-pose, and face feature vector detections in respective image processing detectors 30a-c, for example in the manner described with reference to FIGS. 3 and 4. Object lightweight data records 40b generated by the respective video processing detectors 30a, 30b, 30c are pushed to respective message-queues 42b, 42e, 42g. For example, the head detector 30a pushes head position records 40b to a head position message-queue 42b. A context detector in the form of a tracker 32b, which is run as a micro-service independent from the video processing detectors 30a-c and message-queuing middleware 36, reads head position records 40b from the head position message-queue 42b, and pushes context detection data records 40c defining detected tracks to a track message-queue 42c. The tracks are read by another context detector in the form of a pass detector 32c, which detects tracks that pass the line L1 (FIG. 1A). The pass detector 32c pushes pass event records to a pass detection message-queue 42d, which is read by a detection filter 32a associating pass events with face feature vectors. For example, a pass event at time t1 may be associated with a certain face feature vector at the position L1. Context data records associating pass events at L1 with respective face feature vectors are pushed to a message-queue 42f, which is read by a re-identification detector 32d.

The video stream 26b (FIG. 1A) generated by the second camera 16b is processed in the very same way, resulting in a similar message-queue 42i holding time-ordered context data records associating pass events at L2 with respective face feature vectors. Also the message-queue 42i is read by the re-identification detector 32d, which may, for example, find a match between the face feature vector of the L1 pass event at time t1 with the face feature vector of the L2 pass event at time t2. The re-identification detector may push match events to a match event message-queue 42h, which may be read by a user-interface application 32f displaying e.g. an updated list of identified persons remaining between L1 and L2.

From the beginning of the installation of the video analytics system 10, real-time data extraction may be started straight away, generating object lightweight data records for any already-configured context detections. The streams of object lightweight data records 40b and context data records 40c will also be persistently stored by the message-queuing middleware 36 in the order received, and retrievable via e.g. timestamps, which will allow for defining new context detections and detection dependency graphs at a later point, based on historic ranges of object lightweight data records 40b and context data records 40c. This permits extensive data refinement in the future without having to process the video in video processing detectors 30a-g again.

Similarly, also the streams of video frame records 40a will be persistently stored by the message-queuing middleware 36 in the order received, and retrievable via e.g. timestamps, which, should there be a need for it, will anyhow allow defining new video processing detectors 30-f and new video processing detection dependencies at a later point, based on historic ranges of video frame records 40a. Alternatively, the video streams 26a-c may be discarded after the real-time video processing in the video processing detectors 30a-g has been done, without storing any video frame records 40a in the message-queuing middleware 36. Thereby, only time-stamped and ordered lightweight data will be stored by the message-queuing middleware 36, which requires very little system resources where the resulting amount of data is of the order a thousandth or even ten-thousandths of the original image data amount of the respective original video streams 26a-c, while still enabling substantial and complex analysis of the lightweight data. For example, in a store, the use of head detection and counting the heads passing entrance and exit may be sufficient to estimate average dwell time in the store. However, for a more accurate estimate at a later point, there may be a need to supplement the head detection with face feature vector information, which can differentiate staff from customers, for example. Alternatively, face feature vectors can assist in subsequent data refinement processes such as forensic tracking of individuals.

Additional Micro-Services

Again with reference to FIG. 2, a video player service 33a may be configured to read streams of stored video records from video frame message-queues and convert them to a standard format to be streamed via standard protocols such as RTSP/RTP. Input to the video player service 33a may be a start time, a stop time and a video stream identity, and output may be an RTSP/RTP stream of the identified video between the start and stop times. If no start or stop times are provided, the video player 33a may keep streaming the latest video frame records received by the respective video frame message-queue indefinitely.

A web server 33b may be configured to provide object lightweight data, context data, stills, and video streams provided by other detectors and services in a web browser-presentable format.

Additional micro-services 33c may provide APIs (application protocol interfaces) for various other types of external access of video data accessible from the message-queuing middleware 36, for example for receiving configuration input, writing lightweight data or video to files or sockets, etc.

Figure 7:
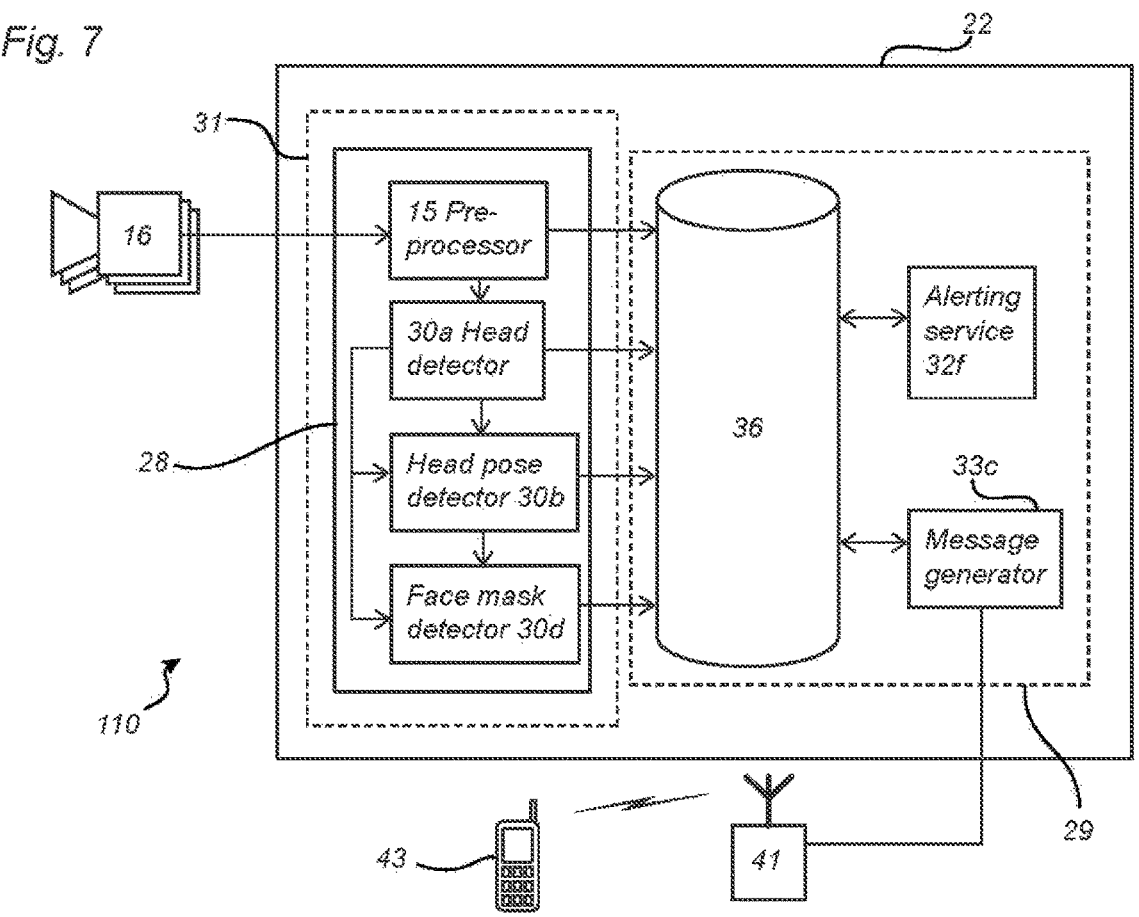
FIG. 7 is a schematic block chart illustrating the functional elements of a video analytics system according to a second embodiment, along with data flows between the functional elements.

FIG. 7 illustrates yet one deployment scenario. A local installation of a video analytics system 110 checks whether people within a monitored area are wearing facemasks, and alerts staff if somebody does not. An arbitrary number of cameras 16 are connected via Power-over-Ethernet interfaces to an edge computer 22. For reasons of clarity, only the data flow originating from one of the cameras 16 is illustrated; it will be appreciated that the dataflows of the other cameras may be similar. The edge computer 22 contains generic processing equipment 29 such as a CPU and memory, and a GPU 31, for example an NVidia Jetson Xavier Nx chip. A Wi-Fi interface 41 is connected to the edge computer 22. The edge computer 22 runs a message-queuing middleware 36, a task-graph scheduler microservice 28 running video processing detectors 30a, 30b, 30d, an alerting microservice 32f, and a message transmitter microservice 33c. A pre-processor 15 receives video streams from all cameras 16 and pushes respective streams of video frame records to respective sets of video processing detectors 30a, 30b, 30d and to respective video frame message-queues operated by the message-queuing middleware 36.

The video frames are processed by a head detector 30a, a head-pose detector 30b, and a face mask detector 30d, the object lightweight data records of which are output to respective message-queues of the message-queuing middleware 36 for storage therein. The streams of video frame records pushed to the respective video frame message-queues are also kept for a short retention period, for displaying the respective videos segments associated with any alerts.

The alerting service 32f implements the alerting logic; for example, if the video stream from a camera 16 incorporates a threshold number of, e.g. 3, consecutive video frames with one or more people not wearing a face mask (but with head-pose appropriate for mask detection), it generates an alert, on the additional condition that no alert has recently been generated, e.g. during the last 2 minutes. The alerts generated by the alerting service are stored as alert records in a respective alert message-queue.

The message transmitter service 33c continuously polls the alert message-queue for alerts. If a new alert is pushed to the queue, the message transmitter service 33c reads a respective video frame from the video frame message-queue, annotates the unmasked head(s), and pushes an alert together with the video frame to handheld devices 43 carried by the staff.

Figure 8:
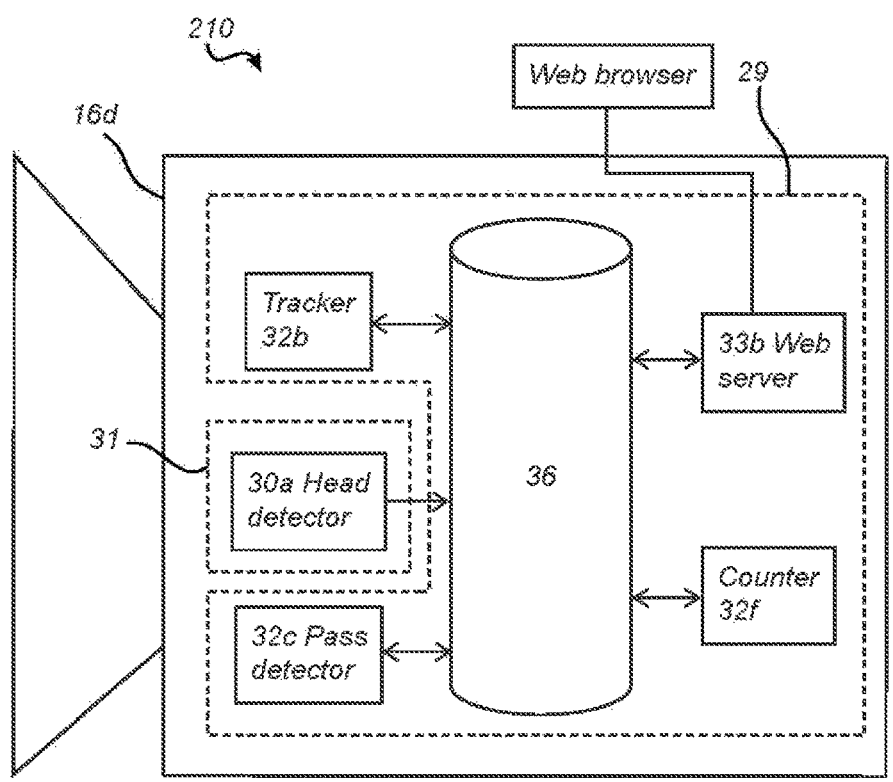
FIG. 8 is a schematic block chart illustrating the functional elements of a video analytics system according to a third embodiment, along with data flows between the functional elements.

FIG. 8 illustrates still another deployment scenario of a video analytics system 210, according to which all the processing takes place in a single piece of hardware within the housing of a smart camera 16d. The example describes a simple "current visitor counter", which counts the incoming persons passing a pass-line L1 (FIG. 1A) in a first direction, and the outgoing persons passing the pass-line L1 in the opposite direction, and displays the current balance as a result. This could e.g. be part of a retail application, for determining how many people are presently in the store. The camera 16d is provided with generic data processing equipment 29 such as a CPU and memory, supplemented with video processing capacity in the form of e.g. a GPU 31. The GPU 31 runs a head detector 30a, whereas the generic data processing equipment runs a message-queuing middleware 36, a tracker 32b, a pass detector 32c, a visitor counter 32f, and a web server 32g enabling accessing the number of persons via a browser 33. The applications 30a, 32b, 32c, 32f, 32g are implemented as respective microservices communicating via the message-queuing middleware 36 in the manner described in detail hereinabove.

Applications

The versatility of the video analytics systems 10, 110, 210 described hereinabove enables a wide range of practical applications. A few examples are given below:

General Crowd Management.

Queue management system for retail stores. Customers may be counted at the doors and in the queuing area in real-time. A prediction model can tell if there will be a queue in the next few minutes and staff may be alerted before it happens.

Fall detection in elderly care homes. The system may e.g. use two 3D calibrated cameras per room and run human body pose estimation in three dimensions. Based on body pose detection, persons that have fallen may be recognized, and an alert may be sent to the staff in real-time. Staff may look at the alert, validate the images, and decide to take action.

Measuring waiting time at airports. Face recognition may be applied at the entrance and exit points in real-time to measure actual waiting time. Thereby, a waiting time prediction may be generated and displayed to customers entering the queue.

Recognition of unsafe escalator usage. Based on head detection, tracking and full body pose detection, various unsafe situations may be recognized such as moving in the wrong direction of the escalator, or leaning out.

There are a number of benefits of the various features described herein. By way of example, storing a video in a message-queue enables an endless flow of video data according to the nature of a video stream, opposite to e.g. conventional video files which have a start point and an endpoint. It also enables easy and inexpensive analysis of stored video frames in a wide timespan without the cost and burden of accessing the entire video. Forensic analysis of already-stored lightweight data in the message-queuing middleware 36 enables experimentation of detection scenarios without losing potentially relevant data, and permits setting up ad-hoc queries. Co-storage of video frames and lightweight data in a message-queuing middleware makes it easy to manage the lightweight data streams because they are ordered in the same sequences, with the same timestamps, as the original video frame records. Message-queues may be accessed by multiple micro-services, enabling parallel processing in multiple types of detections or other analysis. By storing ordered streams of lightweight data in message-queues, it is possible to add composite detections long after the original video is gone. Moreover, by anonymizing or discarding the video frames, privacy is maintained. Persistent message-queues of ordered video frames, object lightweight data and context data provides a full evidence log of the detection history, as opposed to e.g. a database, where individual records may be updated or replaced.

The invention has mainly been described above with reference to a few embodiments. However, as is readily appreciated by a person skilled in the art, other embodiments than the ones disclosed above are equally possible within the scope of the invention, as defined by the appended patent claims.

For example, the video analytics systems 10, 110, 210 described in detail hereinabove analyze video streams 26a-c received directly from a set of cameras 16a-c. However, the video streams 26a-c may also be read from a file system and fed to any of the video analytics systems 10, 110, 210 for forensic analysis. Moreover, the video analytics systems 10, 110, 210 described in detail hereinabove analyze video streams 26a-c depicting persons, and detect various properties of persons. The video analytics systems 10, 110, 210 may however be employed for detecting and analyzing also other objects and properties of objects, such as detecting vehicles and reading the license plates of vehicles.

In the claims, the word "comprising" does not exclude other elements or steps, and the indefinite article "a" or "an" does not exclude a plurality.

What is claimed is:

1. A computer-implemented method of processing a video stream, comprising:
   receiving at least one video stream depicting an object;
   providing the at least one video stream to at least two video processing detectors, each video processing detector comprising a respective deep convolutional neural network trained to detect one or more of the object or a property of the object;
   receiving a respective stream of object lightweight data records from each of the respective video processing detectors, the streams of object lightweight data records generated based on the respective detection, and representing a property of the object; and
   providing at least one stream of object lightweight data records to at least one context detector configured to perform a secondary detection based on object lightweight data of the stream of object lightweight data records,
   wherein the detections of the at least two video processing detectors are scheduled by a task-graph scheduler, wherein the at least two video processing detectors comprise a first video processing detector comprising a first respective deep convolutional neural network trained to detect one or more of the object or a first property of the object, and a second video processing detector comprising a second respective deep convolutional neural network trained to detect one or more of a second property of the object, wherein the second detector detects the second property of the object based on lightweight data from the first video processing detector.

2. The computer-implemented method of claim 1, wherein the task-graph scheduler is configured to schedule the providing of the at least one video stream to and from the video processing detectors based on a video processing dependency graph received from a configuration input.

3. The computer-implemented method of claim 1, wherein the at least one video stream comprises two or more video streams, wherein the task-graph scheduler organizes the video processing detections of each of the two or more video streams in a respective task-graph.

4. The computer-implemented method of claim 1, wherein each video stream of the at least one video stream depicts two or more objects, wherein the task-graph scheduler is configured to incorporate a respective task-graph branch for each of the two or more objects.

5. The computer-implemented method of claim 1, wherein the detections of the context detectors are scheduled according to a dependency graph received from a configuration input.

6. The computer-implemented method of claim 1, wherein the at least two video processing detectors are run in a single process on a graphics processing unit (GPU), and providing the at least one video stream to at least two video processing detectors comprises writing to a GPU memory shared by the first and second video processing detectors.

7. The computer-implemented method according to claim 1, wherein the object comprises a license plate.

8. The computer-implemented method according to claim 1, wherein the video stream comprises uncompressed video.

9. The computer-implemented method according to claim 1, wherein the video stream comprises a stream of compressed video.

10. Data processing equipment comprising at least one processor and memory configured to:
    receive at least one video stream depicting an object via a transfer protocol;
    re-package the at least one video stream to a stream of video frame records, each video frame record representing an integer number of video frames;
    provide the at least one video stream to at least two video processing detectors, each video processing detector comprising a respective deep convolutional neural network trained to detect one or more of the object or a property of the object;
    receive a respective stream of object lightweight data records from each of the respective video processing detectors, the streams of object lightweight data records generated based on the respective detection, and representing a property of the object; and
    provide at least one stream of object lightweight data records to at least one context detector configured to perform a secondary detection based on object lightweight data of the stream of object lightweight data records,
    wherein the detections of the at least two video processing detectors are scheduled by a task-graph scheduler.

11. The data processing equipment according to claim 10, wherein the at least one processor and memory are configured to:
    provide at least one stream of object lightweight data records to the at least one context detector via a message-queuing middleware, and
    provide the stream of video frame records to the message-queuing middleware.

12. The data processing equipment according to claim 11, wherein the at least one processor and memory are configured to cause the message-queuing middleware to store received streams of object lightweight data records and video frame records.

13. The data processing equipment according to claim 10, wherein the at least one processor and memory are further comprising configured to:
    when feeding an object lightweight data record to at least one context detector, discard the video frame based on which the object lightweight data record was generated.

14. The data processing equipment according to claim 10, wherein the context detection is a composite detection based on multiple instances of lightweight data records of a single stream of lightweight data records.

15. The data processing equipment according to claim 10, wherein said context detection is a composite detection based on instances of lightweight data records from more than one stream of lightweight data records.

16. The data processing equipment according to claim 10, wherein said property of the object comprises one or more of a position, a feature vector, or an orientation of the object.

17. The data processing equipment according to claim 10, wherein the context detection comprises one or more of motion tracking of the object, re-identification of the object at different places and/or different times, or detection of the object passing a virtual line within a scene.

18. The data processing equipment according to claim 10, wherein the context detector comprises a neural network trained to detect an event.

19. The data processing equipment according to claim 10, wherein the object comprises a person or a body part of a person, and the lightweight data represents one or more of a position, a feature, or an orientation of a body part of the person.

20. The data processing equipment of claim 19, wherein the at least one video processing detector comprises at least one deep convolutional neural network configured to perform a respective one of head detection, head-pose detection, demographic detection, feature vector extraction associated with the appearance of a person, or and skeleton model extraction associated with the full-body posture of a person.

21. The data processing equipment of claim 10, wherein the at least one processor and memory are further configured to read a stream of video frame records from the message-queuing middleware at a later point in time for forensic analysis.

22. The data processing equipment of claim 21, wherein the at least one processor and memory are further configured to provide each video frame record with a unique identity, and associate each object lightweight data record with a respective video frame record or a respective range of video frame records.

23. Data processing equipment comprising at least one processor and memory configured to:

receive at least one video stream depicting an object;

provide the at least one video stream to at least two video processing detectors, each video processing detector comprising a respective deep convolutional neural network trained to detect one or more of the object or a property of the object;

receive a respective stream of object lightweight data records from each of the respective video processing detectors, the streams of object lightweight data records generated based on the respective detection, and representing a property of the object; and provide at least one stream of object lightweight data records to at least one context detector configured to perform a secondary detection based on object lightweight data of the stream of object lightweight data records, wherein the detections of the at least two video processing detectors are scheduled by a task-graph scheduler, wherein the at least one processor and memory are configured to provide the at least one stream of object lightweight data records to the at least one context detector via a message-queuing middleware, and wherein the at least one processor and memory are configured to implement the at least one context detector as a micro-service configured to read the stream of object lightweight data records from the message-queuing middleware, and to write a stream of context data to the message-queuing middleware.

24. The data processing equipment of claim 23, wherein the at least one context detector is implemented as a micro-service configured to read the stream of object lightweight data records from the message-queuing middleware, and to write a stream of context data to the message-queuing middleware.

25. The data processing equipment of claim 24, wherein the message-queuing middleware receives respective streams of object lightweight data records from more than one task-graph scheduler.

* * * * *